United States Patent [19]

Schlüter

[11] 4,284,873

[45] Aug. 18, 1981

[54] WELDING TORCH

[75] Inventor: Jürgen Schlüter, Laatzen, Fed. Rep. of Germany

[73] Assignee: E. Schlüter Fachhandel für Schweisstechnik, Laatzen, Fed. Rep. of Germany

[21] Appl. No.: 41,513

[22] Filed: May 22, 1979

[30] Foreign Application Priority Data

May 26, 1978 [DE] Fed. Rep. of Germany ....... 2823037

[51] Int. Cl.³ ................................................ B23K 9/00

[52] U.S. Cl. ............................... 219/136; 219/137.41; 219/137.62

[58] Field of Search ...................... 219/137.41, 137.62, 219/74, 136

[56] References Cited

U.S. PATENT DOCUMENTS

| | | | |
|---|---|---|---|
| 3,798,409 | 3/1974 | Troyer | 219/137.41 |
| 3,886,344 | 5/1975 | Frantzreb | 219/137.41 |
| 4,105,891 | 8/1978 | Hill | 219/74 |
| 4,109,131 | 8/1978 | Schluter | 219/137.62 |

*Primary Examiner*—Elliot A. Goldberg
*Attorney, Agent, or Firm*—Michael J. Striker

[57] ABSTRACT

A torch for welding, cutting or heating comprises a torch housing which has a front end portion which is provided with an outlet which faces towards an object to be treated. Heat is created at the outlet for operation of the torch, which results in development of fumes and heat at the front end portion of the housing. A cooling medium is so circulated through the housing as to cool the front end portion thereof and remove the fumes developed at the front end portion.

13 Claims, 1 Drawing Figure

U.S. Patent Aug. 18, 1981 4,284,873
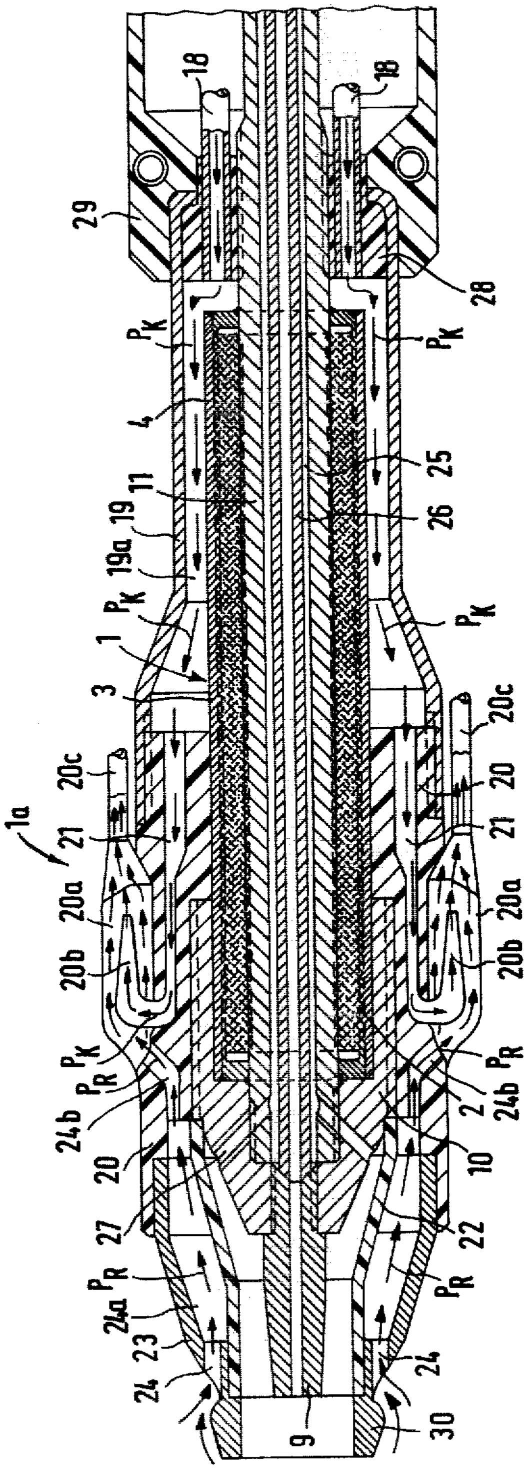

WELDING TORCH

BACKGROUND OF THE INVENTION

The present invention relates to a welding-, cutting-, or heating torch with a torch head provided with an outlet nozzle or outlet nozzles and a torch body connecting the torch head with a torch housing and provided with feed passages therethrough, whereby at least part of the torch body and the torch head is flown through by a cooling medium for convective heat transmission.

The modern use of such torches and especially welding torches for hand or machine operation leads to increased temperatures in the region of the torch head nozzles. This is especially the case during so-called protective gas welding, since the thermal loading of the torch head increases during use of protective gases, especially by use of nozzle gases, such as argon or helium.

In known torches of the above-mentioned kind, it has been tried to cool the torch head, and especially the thermally highly loaded nozzle zone thereof, exclusively by cooling media under use of convective heat transmission. However, it has been recognized that the known cooling systems operating strictly with convective heat transmission have the basic disadvantage that only a relatively small temperature drop is possible at a heat transport over longer distances or that large amounts of cooling media with a high flow speed are necessary.

It has been further suggested (see U.S. Pat. No. 4,109,131) to arrange a hermetically sealed heat transmission system between the thermally highly loaded region of the torch head and a region of the torch body which is circumcirculated and/or flowed through by the cooling medium. The heat transmission system contains a heat transporting medium with an automatic heat transport between its heat receiving and its heat releasing zone. At least the heat releasing zone is circumcirculated or flowed through by the cooling medium. With such a heat transmitting system it is possible to transmit the heat developed at the torch head over a relatively short transmitting distance and with high speed to the region of the torch which is flowed-through by the cooling medium, whereafter the thus-transmitted heat is transported away by the cooling medium. The cooling system of the torch is thus divided in a primary system, consisting of the heat transmitting system and a secondary system with convective heat removal, whereby in practice an extremely active thermal cooling of the torch head is obtained. A protective gas may be used for complete cooling, so that additional systems for the cooling medium of the convective heat transmission with their disadvantages may be dispensed with. A considerable simplification of the torch construction is thereby obtained, in addition to the aforementioned efficient cooling of the torch head.

During operation of the torch, especially during welding or cutting by the latter, fumes develop at the region of the torch head. Obviously, the fumes significantly impair the working conditions for an operator or even make these conditions dangerous for the operator's health.

In German Offenlegungsschrift No. 2,217,770 it has been suggested to provide the torch head with circumferential channels surrounding the outlet nozzle for removing the fumes through these channels. For this purpose, the torch is provided with a separate arrangement for removing these fumes by suction from the torch head. The suction arrangement includes conduits for a suction medium, which extend over the entire length of the torch. Obviously, the suction medium and the suction-medium conduits become subjected to comparatively high thermal loads. Moreover, the suction arrangement requires, besides the conduits, additional pipe connections, corresponding connecting elements, etc., which considerably complicate on the one hand the construction of the torch in general and on the other hand the manipulations with such a torch. It is to be also mentioned that such a suction arrangement substantially increases the cost of the torch.

SUMMARY OF THE INVENTION

It is a general object of the present invention to avoid the disadvantages of the prior art torches.

More particularly, it is an object of the present invention to provide a torch with an arrangement for removing fumes developed during the operation of the torch to thereby eliminate (or reduce) danger to and/or the negative effect of the fumes on, an operator's health.

Another object of the present invention is to provide a torch with an arrangement for removing fumes developed during the operation of the torch, which arrangement is simple and reliable so that it does not significantly complicate the construction of and the manipulations with the torch.

Still another object of the present invention is to provide a torch with an arrangement for removing fumes developed during the operation of the torch, which arrangement does not substantially increase the cost of the torch itself.

In pursuance of these objects and others which will become apparent hereafter, one feature of the present invention resides in providing a torch which comprises a torch housing having a front end portion which has an outlet adapted to face towards an object to be treated. Means are provided, for creating the heat at said outlet necessary for operation of the torch, resulting in development of fumes and heat at said front end portion of the housing. Means are further provided, for so circulating a cooling medium (e.g. gas, such as compressed air) through said housing as to cool said front end portion thereof and remove the fumes developed at said front end portion.

In accordance with another feature of the invention, the torch includes elongated hermetically closed heat transmitting means which are confined in their entirety within said housing for automatically transporting heat from a heat receiving zone, which is adjacent said front end portion, to a heat releasing zone which is rearwardly of said heat receiving zone. The circulating means include first passage means which have a first inlet for introducing the cooling medium into the housing adjacent said heat releasing zone and extending in direction towards said heat receiving zone and a first outlet located substantially at said heat receiving zone so that the cooling medium passes through said first passage means cooling the heat at least at said heat releasing zone and leaves the housing through said first outlet.

In yet another feature of the present invention, the heat transmitting means include a tubular heat transporting body adapted for flow of a heat transporting fluid from said heat receiving zone to said heat releasing zone, and from the latter back to said heat receiving zone. The heat transporting fluid is circulated through said body due to change of its density in dependence on the different temperatures of said zones.

In still another feature of the invention, the circulating means further include second passage means which have a second inlet open outwardly away at said front end portion and adjacent to said outlet thereof and extending in direction towards and open into said first passage means and adjacent to said first outlet of the latter. Thus, on its movement towards said first outlet, said cooling medium aspirates the fumes from said second inlet and through said second passage means towards said first outlet of said first passage means.

In a further feature of the invention, the housing further has a rear end portion and connecting means in form of outer sleeve means connecting said rear end portion to the front end portion (i.e. a torch head). The torch head is provided with a fume guiding passage (i.e. second passage means) having one end (i.e. second inlet) open outwardly away and adjacent to said outlet of the torch head, and another end. The rear end portion has a cooling medium guiding passage (i.e. first passage means) having one open end (i.e. first inlet) for introducing the cooling medium, and another open end. The sleeve means include a member which has a first passage communicating with the other end of said fume guiding passage, and a second passage communicating with the other end of the cooling medium guiding passage. The first and second passages in said member merge one into the other so as to constitute together a channel open outwardly away (i.e. first outlet) from said housing.

Thus, the cooling medium flows in a starting portion of the second passage, i.e. a portion adjacent the rear end portion of the torch, in a direction opposite to that of the fumes flowing through the first passage in said member. However, the second passage is then curved, forming a Venturi tube, so as to guide the cooling medium parallel to the flow of the fumes and towards said outlet from said channel.

In yet another feature of the present invention, the second passage of said member is so shaped and dimensioned that the cooling medium exits said second passage into the channel, creating in the latter an area of reduced pressure to thereby aspirate the fumes into said channel.

It is to be understood that the reduced pressure area at the outlet channel is adequate to aspirate the fumes from the front end portion of the torch. However, an additional aspirating device (e.g. an aspirating pump) can be coupled to the outlet of said channel to thereby increase the effectiveness of the fumes-aspirating process. In this case, the additional aspirating device is located outside the torch so as not to complicate the manipulations with the same during the operation of the torch.

In still another feature of the present invention the front end portion is provided with a tubular member of insulating material, extending through said front end portion and dividing the interior of the latter into an outer annular passage (i.e. fumes guiding passage) and an inner annular passage which constitutes said means for supplying the protective medium (e.g. gas).

It is to be mentioned that in order to adapt the known torch (see U.S. Pat. No. 4,109,131) to the present invention one has to slightly change the construction of said sleeve means. As to the remaining parts of the above mentioned torch, they can be used entirely unchanged which fact makes the torch of the present invention very economical since the necessary alterations of the sleeve means are very simple and do not substantially increase the cost of the torch itself.

On the other hand, the torch of the present invention undergoes high thermal loads (due to the hot fumes) only at a comparatively short front end portion, that is the torch head. However, since the torch head is conventionally of heat insulating material, the heat development caused by the fumes does not negatively affect the torch head in particular and the torch itself in general.

In order to insure low pressure of the cooling medium exiting the second passage into said outlet channel, the respective end of the second passage forms a jet (or jets) which blows the cooling medium into the outlet channel in the same direction as that of the flowing fumes. Obviously, any back-flow of the cooling medium or the fumes (or a mixture of both of them) is precluded. The member (i.e. the sleeve means) constitutes a unit having the above-mentioned passages and jets. Such a unit is rigidly connected (e.g. integrally connected) to the torch head (i.e. the front end portion).

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The single FIGURE shows a longitudinal section of a part of a torch according to the present invention.

DESCRIPTION OF PREFERRED EMBODIMENTS

Referring now to the FIGURE, it may be seen that the reference numeral 1*a* designates a front part of a manually or machine-operated welding torch. The present invention concerns only the front 1*a*. The rest part of the welding torch is known per se and therefore does not require a detailed discussion or illustration. However, it is to be mentioned that the present invention is an improvement of the torch illustrated in U.S. Pat. No. 4,109,131 which is herewith incorporated by reference.

The front part 1*a* is provided with a heat pipe 1. The heat pipe 1 may be divided according to FIGURE into a heat receiving zone 2, a heat transporting zone 3 and a condensation or heat releasing zone 4.

The heat pipe 1 is a "heat-conductor" with high conductive capacity, which has the task to receive the operating heat of the welding torch over the welding wire guide and current conductive nozzle 9 and over the intermediate member 10 in the heating or heat receiving zone 2.

The wire guide and current conductive nozzle 9, as well as the intermediate member 10, are preferably formed from copper which has a good current and heat conductive capacity. The intermediate member 10 has a large volume, in order to quickly and effectively transmit the working temperature of the nozzle 9 to the heat receiving zone 2 of the heat pipe 1. Preferably the intermediate member 10 and the heat pipe 1 are connected in the heat receiving zone 2 of the latter by welding or soldering.

Thus, the heat is transmitted from the heat receiving zone 2 via the heat transporting zone 3 to the heat releasing zone 4 of the heat pipe 1. The heat transport medium for the heat pipe 1 is preferably water. The heat-transmitting process is conventional (i.e. described in greater detail in U.S. Pat. No. 4,109,131) and therefore does not require a detailed discussion.

Two streams of a pressurized medium (e.g. gas) are guided along the heat releasing zone 4 and in direction towards the heat receiving zone 2 of the heat pipe 1.

A first, inner protective gas stream is guided through an annular channel 25 in axial direction through the torch. The annular channel 25 results from the radial distance between the inner surface of a torch tube 11 (which is tightly integrated in the heat pipe 1) and a tube 26 for guiding the welding wire. The first, inner protective gas stream reaches, over four bores 27 formed in the intermediate member 10, the inner portion of a torch head. This inner protective gas stream serves to protect the material emanating from the end of the wire guide nozzle 9 from the detrimental influence of the outer atmosphere.

A metal gas nozzle 23 is provided with bores 24 open into respective passages 24*a* for removing fumes generated during the operation (e.g. welding) by the torch. The process of removing the fumes from the operating zone into the passages 24*a* and further out of the front part 1*a* will be discussed in detail later on.

The gas nozzle 23 is provided with an insulating sleeve 22 which is of electrical and heat insulating material. The bores 24, e.g. eight of them, are uniformly distributed over the circumference of the metal gas nozzle 23, onto the welding border zone and concentrically relative to the axis of the front part 1*a* of the torch.

The passages 24*a* of the gas nozzle 23 are open into respective passages 24*b* which are provided (e.g. concentrically to the axis of the front part 1) in an insulating sleeve 20 which consists of an electrically and heat insulating material. The passages 24*b* (e.g. eight of them) extend, circumferentialy spaced from one another, through the insulating sleeve 20. The insulating sleeve 20 is fixedly connected (e.g. screwed in) an outer sleeve 19 of the torch. On the other hand, the insulating sleeve 20, at the other side thereof, is fixedly connected (e.g. screwed on) to gas nozzle 23. The sleeve 20 is provided with an annular chamber 20*a* which communicates on the one hand with the passage 24*b* for guiding the fumes and on the other hand with passages 20*b* which are a portion of a passage 21 for guiding the cooling medium from a channel 19*a* surrounding the heat releasing zone 4 and the heat transporting zone 3 of the heat pipe 1. The cooling medium is guided into the chamber 20*a* in the direction designated by arrows Pk, whereas the fumes are guided in the chamber 29*a* in the direction designated by arrows Pr. The cooling medium is transmitted from a source of the cooling medium, not shown in the FIGURE, through two conduits 18. When the cooling medium is in the channel 19*a* (that is between the inner surface of the outer sleeve 19 and the outer surface of the heat pipe 1), the heat of evaporation released at the outer wall of the condensation zone 4 is transported during the operation by the cooling medium into the passage 21 in the sleeve 20 and further through the passages 20*b* into the chamber 20*a* towards outlets 20*c* thereof. It is to be seen from the FIGURE, that the cooling medium is guided along the channel 19*a* and the passage 21 in the direction opposite to that of the fumes flowing through a passage 24*a* and 24*b*. However, before entering the chamber 20*a*, the cooling medium is guided in a reverse direction, that is parallel to that of the fumes (see arrows Pr). For this purpose, the passages 20*b* are bent by 180° relatively to the passage 21.

The ends of the passages 20*b* form jets so as to ensure that the cooling medium leaving the passage 20*b* creates in the chamber 20*a* an area of low pressure. Due to the low pressure in the chamber 20*a*, the fumes flow into the chamber 20*a*, that is towards the area of the low pressure. In the chamber 20*a* the fumes intermix with the cooling medium, and together they leave the front part 1*a* through the outlet 20*c*. It is to be understood that the number of the passages or jets 20*b* and of the outlets 20*c* may correspond to that of the bores 24 or the passages 24*b* and is eight in a preferred embodiment. It may be advisable to form the outlets 20*c* of a smaller cross-section than that of the chamber 20*a* to thereby facilitate the removal of the mixture (i.e. the cooling medium and the fumes) from the latter.

The cooling medium is gas and preferably compressed air.

Thus, the sleeve 20 forms the above-mentioned passages which ensure that the fumes are aspirated from the welding zone into the passages 24*a* through the inlets 24 by the cooling medium which is introduced through the conduits 18 into the channel 19*a* so as to absorb the heat at the outer surface of the heat releasing zone 4 and remove the fumes from the welding zone. It is to be noticed in this context that the task to remove the fumes from the welding zone of the torch is solved by the present invention in a simple, inexpensive and reliable manner. Only a portion of the insulating sleeve has to be changed in the torch illustrated in U.S. Pat. No. 4,109,131 in order to effectively remove the fumes from the welding zone of the torch. On the other hand, an outer passage for the protective gas, of the torch in U.S. Pat. No. 4,109,131 may be used without any changes whatsoever for guiding therealong on the one hand the cooling medium and on the other hand the fumes from the welding zone.

According to the present invention, the hot fumes are guided only along a relatively short section of the torch, which section is conventionally of heat insulating material.

It is to be understood that the constructive solution of the fumes-removing arrangement may be accomplished differently from that disclosed with reference to the embodiment shown in FIGURE. However, the basic concept of the present invention is to use the cooling medium not only for its inherent purpose (i.e. to cool the heat pipe 1) but also to remove the fumes from the welding zone.

The gas nozzle 23 may have a front end portion thereof formed with bulges 30 (or blades) in order to guide the fumes developed in the welding zone right into the inlets 24.

The cross-section of configuration of the passages 24*a* and 24*b* can be different from that disclosed with reference to the embodiment shown in FIGURE. This can be done in order to obtain the most convenient and effective guiding of the fumes along these passages.

The cooling medium may be any gaseous substance, for example protective gas.

The number of the passages 20*b* (i.e. jets) can be changed freely so as to suit the desired effectiveness of the torch. In the embodiment shown in the FIGURE, there are eight passages 20*b* circumferentially spaced from one another. Obviously, the number of the passages 21 in the sleeve 20 corresponds to the number of the passages 20*b*, that is there are eight passages 21 in the embodiment shown in the FIGURE.

A bushing 28 of electrical and heat insulating material serves to receive the front part 1*a* of the torch and the torch tube 11. The two gas conduits 18 are molded into the bushing 28. The bushing 28 is surrounded by a casing 29.

It will be understood that each of the elements described above, or two or more together, may also find a useful application in other types of a torch differing from the types described above.

While the invention has been illustrated and described as embodied in a torch, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A torch, particularly a metal inert gas welding torch, comprising a torch housing having a front end portion provided with an outlet nozzle adapted to face towards an object to be treated with the torch, and having an outlet at which welding heat and fumes develop in operation of the torch; elongated hermetically closed heat transmitting means confined in its entirety within said housing for automatically transporting heat from a heat receiving zone adjacent said front end portion to a heat releasing zone rearwardly spaced from said heat receiving zone; and combined means for cooling said front end portion and for removing the fumes which develop in operation of the torch, comprising a chamber in said front end portion and having an outlet, means for circulating a cooling medium into said chamber and through said outlet thereof, means for creating a pressure drop in the cooling medium entering the chamber so as to produce suction in the chamber, and channel means connecting said chamber with fume inlet means located in the region of said outlet nozzle near the operating zone and integrated with said outlet nozzle, so that the suction produced in said chamber aspirates fumes through said inlet means and through said channel means and causes them to mix with the cooling medium in the chamber.

2. A torch as defined in claim 1, wherein said combined means include passage means having an first inlet for introducing the cooling medium into the housing adjacent said heat releasing zone and extending in direction towards said heat receiving zone so that the cooling medium passes through said passage means cooling the heat at least at said heat released zone.

3. A torch as defined in claim 1, wherein said housing further includes a rear end portion and connecting means in form of outer sleeve means connecting said rear end portion to said front end portion constituting a torch head.

4. A torch as defined in claim 1, wherein said channel means circumferentially surrounds said outlet of said front end portion.

5. A torch as defined in claim 1, wherein said channel means include channel circumferentially spaced from one another and concentric with an axis of said front end portion.

6. A torch as defined in claim 3, wherein said torch head is of metal.

7. A torch as defined in claim 3, wherein said sleeve means include an intermediate member of heat insulating material.

8. A torch as defined in claim 7, wherein said intermediate member is of electrically insulating material.

9. A torch as defined in claim 3, wherein said front end portion is provided with a tubular member of insulating material, extending through said front end portion and dividing the interior of the latter into an outer annular passage constituting the fume guiding channel means and an inner annular passage constituting a protective-medium-supplying means.

10. A torch, particularly a metal inert gas welding torch, comprising a torch housing having a front end portion provided with an opening adapted to face towards an object to be treated; means for creating at said opening requisite heat for operation of the torch with concomitant development of fumes at said front end portion of the housing; elongated hermetically closed heat transmitting means confined in its entirety within the housing for automatically transporting heat from a heat receiving zone which is adjacent said front end portion to a heat releasing zone which is rearwardly spaced from said heat receiving zone; and means for so circulating a cooling medium through said housing as to both cool said front end portion of the housing and remove the fumes by action of said cooling medium, said circulating means including a chamber located substantially at said heat receiving zone and having an outlet, passage means having first inlet means for introducing the cooling medium into the housing adjacent said heat releasing zone and extending in directions towards said heat receiving zone and Venturi means communicating with said chamber so that the cooling medium passes through said passage means cooling the housing at least at said heat releasing zone and thereupon passes through said chamber in which it creates suction before leaving the chamber through said outlet, said circulating means further including channel means having second inlet means at said opening and extending in direction towards and open into said chamber adjacent to said Venturi means so that, due to the suction created during movement of the cooling medium through said chamber the cooling medium aspirates fumes from said second inlet means and through said channel means towards said outlet of said passage means and out of said housing.

11. A torch, comprising a torch housing having a front end portion provided with an opening adapted to face towards an object to be treated, means for creating at said opening requisite heat for operation of the torch with concomitant development of fumes and heat at said front end portion of the housing; elongated hermetically closed heat transmitting means confined in its entirety within the housing for automatically transporting heat from a heat receiving zone which is adjacent said front end portion to a heat releasing zone which is rearwardly spaced from said heat receiving zone; and means for so circulating a cooling medium through said housing as to both cool said front end portion of the housing and remove the fumes by the action of said cooling medium, said circulating means including a chamber in said housing adjacent said heat receiving zone, and having a chamber outlet, channel means having one end open outwardly away from said front end portion of the housing and to the exterior thereof and another end communicating with said chamber, passage means having an inlet for introducing the cooling medium into the housing adjacent said heat releasing zone and having one portion extending in direction towards said heat receiving zone and another portion extending from said one portion counter to said direction and having a convergent outlet opening into said chamber so that the cooling medium, after passing through said one portion and cooling the housing at least at said heat releasing zone and thereafter exiting said outlet into said chamber, creates therein an area of reduced pressure before leaving said chamber through said chamber outlet, whereby fumes become aspirated into said chamber through said channel means due to said reduced pressure in said chamber to become mixed with and entrained by said cooling medium flowing in said chamber towards and out of said chamber outlet.

12. A torch as defined in claim 11, said housing further having a welding tip for guiding a wire to be by a respective current and means for supplying a protective gas to the front end portion of said housing, said housing including a metallic gas nozzle located concentrically with a torch axis and surrounding an intermediate torch head member, an intermediate sleeve of thermally and electrically insulating material, surrounding at least said heat receiving zone of said heat transmitting means, an injection device formed in or on said sleeve, said injection device having at a side thereof facing said opening of said front end portion, said channel means.

13. A torch as defined in claim 12, and further comprising an insulating sleeve having an outer surface bounding together with an inner surface of said metallic gas nozzle said channel means.

* * * * *